Patented Aug. 16, 1949

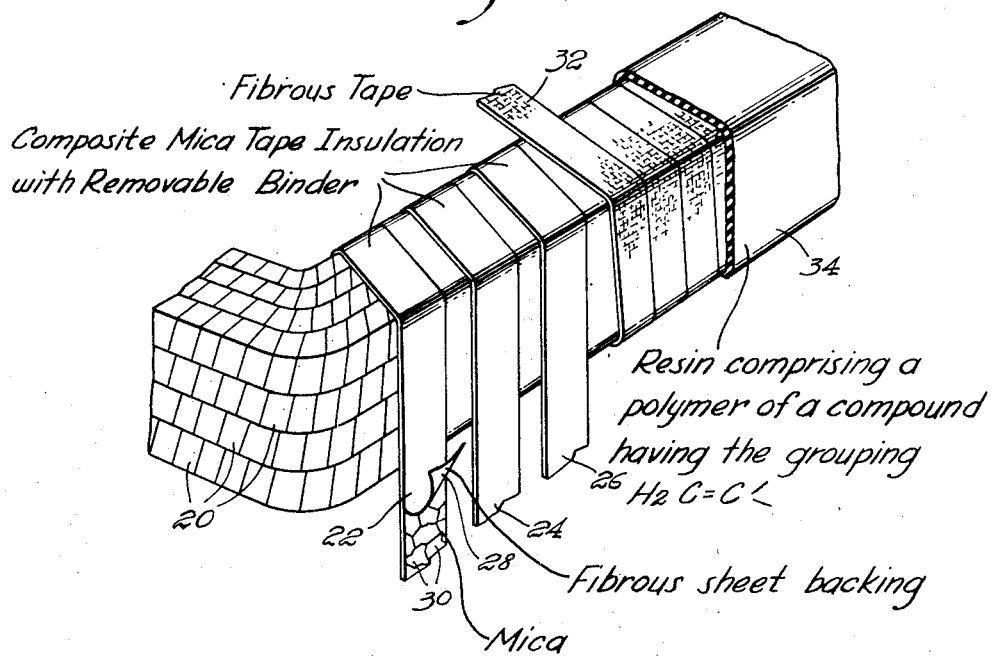
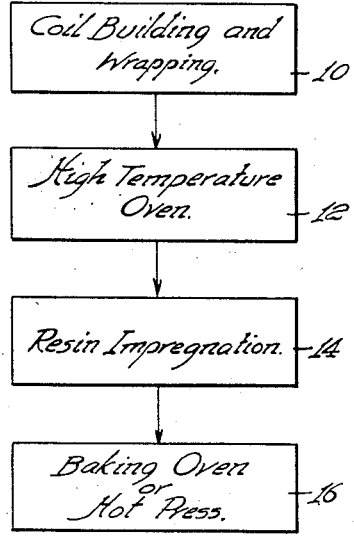

2,479,417

UNITED STATES PATENT OFFICE 2,479,417

ELECTRICAL INSULATION

Earl L. Schulman and John S. Johnson, Wilkinsburg, Pa., assignors to Westinghouse Electric Corporation, East Pittsburgh, Pa., a corporation of Pennsylvania Application July 20, 1945, Serial No. 606,208

9 Claims. (Cl. 175—21)

This invention relates to electrical insulation and the method of preparing the same, and more particularly to electrical conductors and coils prepared from composite insulation embodying resins.

In order to secure high space efficiency and high insulation quality in electrical coils, it has been customary to apply to the assembled turns of a conductor forming a coil a wrapping of composite insulation composed of a fibrous sheet carrying mica flakes united with a resinous binder. A predetermined thickness of the composite mica insulation is wrapped about the assembled turns of the coil in order to provide satisfactory coil-to-ground insulation.

Further, to assure the optimum electrical insulation possible, coils wrapped with the composite insulation are impregnated with an insulating varnish. The impregnating process for the wrapped coil comprises, generally, first, a vacuum treatment to remove moisture, gases and other deleterious volatile material from the coil wrappings and then an application of a varnish, which ordinarily is a polymerizable resin in a volatile solvent, often under pressure, in order to assure penetration to the innermost interstices of the coil. Subsequently, the varnish impregnated coil is heat treated by baking in order to remove the volatile solvent and to polymerize the resin in the varnish.

However, coils made according to the above procedure even under the most careful supervision, with as much as four successive varnish treatments, have been found to be incompletely impregnated with the insulating resin. Electrical power factor tests with increasing voltage usually indicate a steady increase in power factor, thereby indicating voids or air spaces. If the coil were solidly impregnated with resin, the change in power factor with change in voltage would be quite small.

Several reasons have been found to account for the incomplete impregnation. The volatile solvent present in the insulating varnish applied to a coil leaves voids when it is driven off during the heat treatment. Attempts to fill the voids by two, three or more repetitions of the varnish impregnation do not appear to give total impregnation, that is, a solid, voidless resin filling.

Furthermore, even the application of a so-called "solventless" or completely polymerizable varnish material does not greatly improve the composite coil insulation. Tests have shown that the resinous binder uniting the mica flakes and the fiber sheet backing in the composite insulation wrapped on the coil functions to greatly hinder the penetration of any varnish impregnant. It is quite unexpected that the binder in the composite insulation exerts so important a restraining action on the varnish penetration. Comparative experiments using composite tapes with and without resinous binder indicate that the major proportion of the difficulty encountered in varnish impregnation of coil may be traced to the presence of said resinous binder in the composite insulation present on the outside of coils.

An important group of solventless or completely polymerizable resins include as one of the basic ingredients liquid monomer vinyl type compounds having the group $H_2C=C<$, such, for example, as monostyrene, methyl methacrylate, allyl alcohol and the like. It is a well known fact that the vinyl type monomers are extremely difficult to polymerize in contact with copper. Copper appears to exercise a powerful inhibiting influence on the polymerization of the monomers. Furthermore, after a brief contact with copper, the monomers turn green and present an unattractive appearance. Therefore, it has been regarded as impractical, if not impossible, to polymerize vinyl type monomers in direct contact with copper.

The object of this invention is to provide for insulating copper conductors with a completely polymerizable resin in combination with a sheet insulating wrapping.

A further object of this invention is to provide a process for satisfactorily polymerizing vinyl type resins in contact with copper.

A still further object of the invention is to provide insulation for conductors comprising a sheet insulating wrapping substantially completely impregnated with a resin.

Other objects of the invention will, in part, be obvious and will, in part, appear hereinafter. For a better understanding of the nature and objects of the invention, reference should be had to the following detailed description wherein:

Figure 1 is a schematic diagram of the process of this invention; and

Fig. 2 is a fragmentary view in perspective of a coil constructed according to the invention.

According to the present invention, composite insulation composed of mica flakes combined with a sheet backing, such, for example, as glass fiber cloth, asbestos cloth and the like with a resinous binder is applied to conductors and then so heat treated that only decomposition products of the resinous binder are present therein immediately preceding the steps of applying an insulating resin to the composite insulation. Composite insulation so prepared and impregnated with a solventless varnish has enabled the successful manufacture of some of the highest quality electrical coils known in the art.

Referring to Fig. 1 of the drawing, there is a schematic illustration of the steps of the processes which have been found to give the exceptionally good electrically insulated coils of this invention. The first step 10 comprises the building of a conductor or a coil by applying a sheet of inorganic wrapping with an organic binder thereto, particularly mica tape with or without an exterior wrapping of glass fiber tape. The coil so prepared is placed in the high temperature oven 12 having an inert atmosphere, such as nitrogen, carbon dioxide or gaseous mixtures or the like, in order to decompose and volatilize the major portion of the resinous binder in the mica tape and to condition the surface of the copper in order to overcome its tendency to inhibit polymerization of vinyl type compounds having the group $H_2C=C<$. The carbonized residue derived from the decomposed resin binder does not significantly affect varnish impregnation of the coils. Thereafter the heat treated coil may be subjected to resin impregnating process at 14 wherein the coil is first evacuated to remove all air and moisture therefrom and then a resin, preferably a solventless, completely polymerizable resin, is applied to the evacuated coil to insure complete impregnation. In some cases we have found that a simple dipping of the heat treated coils in the solventless resin is satisfactory if the coil is baked in a press 16 under sufficient pressure to cause the resin to be forced into the interstices of the mica tape. Otherwise, the vacuum impregnated coils are put into the baking oven 16 for heat treatment at temperatures of the order of 125° C. to 150° C. which will polymerize the resin into a hard and infusible state.

Composite insulation suitable for the purpose of this invention is composed of mica flakes and an inorganic sheet fibrous backing to withstand the heat treatment prepared in the conventional manner wherein the mica flakes and sheet backing are bonded by means of an organic resinous binder, preferably a flexible binder, such, for example, as polyisobutylene, terpene-castor oil mixtures, asphaltic materials, or the like. The sheets of insulation so prepared are usually cut into tapes for convenient application to conductors, but may be applied in any other shape or form.

The tape is applied to a copper conductor generally when several turns of the conductor have been wound to form a coil. By "coil" we refer not only to structures having a plurality of turns of conductor but also to structures comprising only one turn or less, alone or superimposed on another conductor, such for example as hairpin coils.

It has been discovered that conductors carrying the insulating composite tape with an organic resinous binder therein may be subjected to a heat treatment in an inert atmosphere for a period of time of the order of one hour at a temperature of from 400° C. to 450° C., thereby to cause the major proportion of the organic binder to decompose and volatilize. The organic binder will carbonize to some extent and leave a slight residue of porous carbon distributed throughout the insulation. Some decomposition products will be found disposed on the surface of the copper conductor. When the conductor with the heat treated insulating tape thereon is removed from the oven, it will be found that the surface of the copper is lightly discolored without, however, any significant deterioration of the metal having taken place.

We have found that complete burning out of the organic binder is not necessary and in fact appears to be undesirable. The composite insulation will become quite loose if the heat treatment is excessive. It appears that the carbon particles exert a binding effect upon the various elements of the tape so that the structure is mechanically stronger if carried out to the extent indicated, rather than completely burned out. Accordingly the heat treatment may be successfully accomplished at temperatures of as low as 300° C. to temperatures as high as 600° C., the time being proportioned to achieve decomposition and volatilization of the resinous binder in the mica insulation without complete burning out.

One of the advantages of the heat treatment is the elimination of the resin binder, thereby avoiding any hindrance to the penetration of the impregnating varnish which is to be applied to the conductor or coil thereafter. An unexpected advantage is that the heat treatment overcomes the inhibiting effect of copper upon polymerization of the vinyl type resins, as described above. Thus, the heat treated copper conductor may be coated with monostyrene or other resins of this type, and the resin will polymerize at its normal rate without any untoward difficulties.

Referring to Figure 2 of the drawing, there is illustrated a coil constructed according to the present invention. The coil is composed of a plurality of conductor turns 20 provided with turn insulation. If each conductor turn 20 is a single wire, bar or strap of copper, the insulation thereon may be composed of a coating of a heat resisting wire enamel such a phenyl ethyl silicone or phenyl methyl silicone alone, or in combination with a wrapping of glass fabric, asbestos or the like, or other insulation. For most purposes, it is sufficient if each conductor turn is wrapped with untreated glass fibers or other inorganic fibers. The glass fibers may be continuous filament fibers, staple fibers or yarn, and they may be applied as strands or as tape or sheets. In some cases, each of the turns 20 may be composed of a group of several conductors assembled as a unit. In such case, the individual turn units may be wrapped with the composite mica tape insulation as described.

The assembled turns 20 of the coil are wrapped with a plurality of layers of composite mica tapes 22, 24 and 26, each layer of tape being shown as butted, though a lapped tape wrapping is equally satisfactory. Obviously any number of layers of composite mica tape may be applied as desired. For example, coils have been prepared with as much as sixteen separate layers of a composite insulation each layer being composed of a sheet backing and five mils of mica. The total thickness of the composite insulation will depend on the required dielectric strength and other factors. As shown, the composite insulation is composed of a fibrous sheet backing 28 and a plurality of mica flakes 30. In most cases the fibrous sheet backing is present on both sides of the layer of mica flakes though only one sheet of the backing 28 may be employed in some instances.

In order to impart better abrasion resistance to the coil and to secure a tighter insulation, it is desirable to apply a final wrapping of a tape 32 of glass fiber fabric, asbestos cloth or other tough fibrous material. The tape 32 is applied to the coil previous to the heat treatment to decompose the resinous binder.

The heat treated coil may be impregnated or dipped into a selected varnish or resin with assurance that the varnish or resin will penetrate throughout the tapes 22, 24 and 26 and the glass tape wrapping 32 to the copper conductor without trapping air or leaving voids. The resin coating may be then heat treated or subjected to actinic light or both to polymerize it to a hardened condition. A hard resin coating 34 will be present upon the surface and throughout the composition insulation wrapped on the coil.

In order to attain the best electrical properties, it is desirable to employ a completely polymerizable liquid impregnant, commonly called a "solventless" varnish, for impregnating the coil prepared as described.

Numerous liquid compositions of this type commonly known as "solventless" varnishes are available. For the purpose of the invention, it has been found that solutions of polyhydric alcohol-maleic acid esters or other alkyd resins dissolved in monostyrene or other polymerizable vinyl type compound having the group $H_2C=C<$ give excellent results when applied to the heat treated coil or conductor. A typical liquid resin composition of this kind suitable for impregnation was prepared by reacting:

|  | Parts |
| --- | --- |
| Propylene glycol | 76 |
| Succinic acid | 112 |
| Maleic anhydride | 4.9 |

(all parts by weight) for 16 hours at temperatures of from 180° C. to 230° C. 60 parts by weight of the alkyd resin so prepared were dissolved in 40 parts by weight of monostyrene with 0.5 part by weight of benzoyl peroxide added as a catalyst. This composition was quite fluid and penetrated coils readily. The coils after being evacuated in an enclosed chamber were treated with the liquid resin composition so prepared, pressure being applied to force it into the coil. After the coils were completely impregnated, they were removed from the enclosed chamber and heated at a temperature of 130° C. for 30 minutes. The resin polymerized to a hard state and had impregnated the composite insulation substantially completely. No voids were found in the coils upon cutting and examining them.

We have found that castor oil esters with an unsaturated dicarboxylic acid may be dissolved in monomers having the group $H_2C=C<$ and applied to coils and then polymerized to a thermoset resin. For example, 100 parts of castor oil were reacted with 20 parts by weight of maleic anhydride at temperatures below 150° C. to form the half ester of the maleic acid. The castor oil maleate was dissolved in an equal weight of monostyrene, producing a low viscosity impregnant that could be completely polymerized into a thermoset solid having good electrically insulating properties.

The monomers having the group $H_2C=C<$, which are solvents for alkyds and esters may be selected to meet requirements. Typical monomers are monostyrene, vinyl acetate, methyl methacrylate, methyl vinyl ketone, acrylonitrile, parachlorostyrene, allyl alcohol and acrylic acid.

The resin products produced by reacting an unsaturated ester or alkyd resin with a monomeric compound having the group $H_2C=C<$ are thermosetting in nature. This property is highly advantageous in that the resins will not flow out of the coils or conductors even at elevated temperatures.

As an indication of the improvement secured by the practice of this invention, the following is typical. Of a group of coils prepared according to prior art practice by wrapping five layers of glass fabric backed mica tape and an outside layer of 0.007 inch glass tape, varnish impregnated and pressed to size, the dielectric strength did not average above 5,000 volts. Coils prepared according to the present invention using five layers of similar glass fabric mica tape and glass tape heat treated for one hour at 450° C. and impregnated with solventless resin had an average breakdown strength of 10,000 volts. Some of the coils held as much as 12,000 volts for 50 seconds. This improvement in dielectric properties is exceptional.

Furthermore, the thermal conductivity of the insulation is greatly improved by the heat treatment of the composite tape in combination with a solventless varnish impregnant. The capacity of electrical apparatus embodying such coils will be higher before unsafe temperatures are reached. When thermoset resins are used as the impregnant, much higher motor and generator overloads may be assumed without the apparatus being damaged.

Other solventless resins may be employed in a similar manner in practicing the process described above. Solutions of monostyrene alone, or carrying a small proportion of polystyrene to control viscosity may be employed in some cases. Likewise chlorinated monostyrene such as dichlorstyrene carrying a proportion of the polymer thereof in order to secure predetermined viscosity may be employed as an impregnant. In some cases, mixtures of gums or tung oil and a drying oil and a drier as described in Goff Patent 1,848,344 may be applied to the coil by such treatment.

It has been found that by applying a solventless composition to a coil having the heat treated composite insulation of this invention, one impregnation is fully sufficient to fill all the interstices and pores of the coil. Not only is good mechanical strength attained, but the best dielectric strength and unusual power factor characteristics are secured from the coils. Moisture absorption is negligible in coils so prepared. Furthermore, corona and other adverse phenomena are not encountered even when voltages of the order of 4000 volts and higher are applied to the coils. Therefore, the highest voltage electrical equipment may be prepared from members treated as described herein.

Obviously, not only rotating machine coils such as field coils, stator coils and the like, but magnetic coils for relays, transformers and the like may be produced in a similar manner. Wherever composite insulation composed of mica flakes and an inorganic fibrous sheet backing followed by a varnish impregnation is employed, the present invention presents many desirable and unusual advantages.

While the composite insulation described herein is particularly described with reference to mica flakes, numerous flake-like materials employed as a substitute or the equivalent of mica flakes may be treated to produce composite insulation as described. For example, films of treated bentonite, vermiculite or the like may be applied to a sheet backing and employed as detailed herein.

Since certain changes in carrying out the above processes and certain modifications in the compositions which embody the invention may be made without departing from its scope, it is intended that all matter contained in the above description or shown in the accompanying drawing shall be interpreted as illustrative and not in a limiting sense.

We claim as our invention:

1. An insulated coil, comprising, in combination, a plurality of turns of a copper conductor, an individual wrapping of inorganic fibrous insulation applied to each turn, a wrapping of mica flakes applied to the assembled turns of the copper conductor, a heat decomposed carbonized organic binder being associated with the wrapping, the surfaces of the copper conductor having heat decomposed organic binder therein, and a resinous binder containing a resin derived from a polymerizable monomeric organic compound having the group $H_2C=C<$, the resinous binder impregnating the wrapping to bond the wrapping to the conductor and to provide for substantially solid insulation of the coil.

2. An insulated conductor comprising, in combination, a copper conductor, a tape composed of a sheet fiber backing and mica flakes wrapped about the copper conductor, and inorganic fibrous sheet wrapped over the mica tape, a carbonaceous residue being disposed in the mica and fibrous sheet, the carbonaceous residue derived from an organic binder originally present in the mica tape by heat treatment of the wrapped conductor in a substantially inert atmosphere at a temperature sufficient to decompose and volatilize the major portion of the organic binder, the surface of the copper conductor being chemically altered by the heat treatment, a coating of heat decomposed organic binder on the copper conductor and a polymerized resin derived from a polymerizable monomeric organic compound having the group $H_2C=C<$ applied to the copper conductor and the wrappings thereon to impregnate the wrappings and to bond the whole into a solid member, the chemically altered surface of the copper conductor being not inhibiting to the polymerization of compounds having the group $H_2C=C<$.

3. An insulated conductor comprising, in combination, a copper conductor, a tape composed of a sheet fiber backing and mica flakes wrapped about the copper conductor, an inorganic fibrous sheet wrapped over the mica tape, a carbonaceous residue being disposed in the mica and fibrous sheet, the carbonaceous residue derived from an organic binder originally present in the mica tape by heat treatment of the wrapped conductor in a substantially inert atmosphere at a temperature sufficient to decompose and volatilize the major portion of the organic binder, the surface of the copper conductor being chemically altered by the heat treatment, a coating of heat decomposed organic binder on the copper conductor, and a thermostat resin copolymer derived from a polymerizable monomeric organic compound having the group $H_2C=C<$ and the reaction product of an olefinic alpha, beta-dicarboxylic acid and an aliphatic alcohol applied to the copper conductor and the wrappings thereon to impregnate the wrappings and to bond the whole into a solid member, the chemically altered surface of the copper conductor being not inhibiting to the polymerization of monomeric organic compounds having the group $H_2C=C<$.

4. An insulated coil comprising a plurality of turns of a copper conductor with inorganic fibrous insulation applied to each turn, a tape composed of a sheet fiber backing and mica flakes wrapped about the plurality of turns of the copper conductor to form them into an integral coil, an inorganic fibrous sheet wrapped over the mica tape, a carbonaceous residue being disposed in the mica and fibrous sheet, the carbonaceous residue derived from an organic binder originally present in the mica tape by heat treatment of the wrapped conductor in a substantially inert atmosphere at a temperature sufficient to decompose and volatilize the major portion of the organic binder, the surface of the copper conductor being chemically altered by the heat treatment, a coating of heat decomposed organic binder on the copper conductor, and a polymerized resin derived from a polymerizable monomeric organic compound having the group $H_2C=C<$ applied to the copper conductor and the wrappings thereon to impregnate the wrappings and to bond the whole into a solid member, the chemically altered surface of the copper conductor being not inhibiting to the polymerization of monomeric organic compounds having the group $H_2C=C<$.

5. An insulated conductor comprising, in combination, a copper conductor, a tape composed of a sheet fiber backing and mica flakes wrapped about the copper conductor, a glass fiber sheet wrapped over the mica tape, a carbonaceous residue being disposed in the mica and glass fiber sheet, the carbonaceous residue derived from an organic binder originally present in the mica tape by heat treatment of the wrapped conductor in a substantially inert atmosphere at a temperature sufficient to decompose and volatilize the major portion of the organic binder, the surface of the copper conductor being chemically altered by the heat treatment, a coating of heat decomposed organic binder on the copper conductor, and a polymerized resin derived from a polymerizable monomeric organic compound having the group $H_2C=C<$ applied to the copper conductor and the wrappings thereon to impregnate the wrappings and to bond the whole into a solid member, the chemically altered surface of the copper conductor being not inhibiting to the polymerization of monomeric organic compounds having the group $H_2C=C<$.

6. In the process of treating a copper conductor carrying mica insulation in which the mica flakes are bonded with an organic binder, with a polymerizable liquid monomeric organic compound having the group $H_2C=C<$, the polymerization being normally inhibited by copper, the steps comprising, heat treating the copper conductor and the mica insulation carried thereby in a substantially inert atmosphere to a temperature of from 300° C. to 600° C. for a time sufficient to decompose and volatilize a major proportion of the organic binder whereby the surface of the copper conductor is chemically altered and coated with heat decomposed organic binder, impregnating the heat treated conductor and mica insulation with a composition comprising the polymerizable liquid monomeric organic compound having the group $H_2C=C<$ and polymerizing the composition into a resin.

7. In the process of treating a copper conductor carrying mica insulation in which the mica flakes are bonded with an organic binder, with a polymerizable liquid monomeric organic compound having the group $H_2C=C<$, the polymerization being normally inhibited by copper, the steps comprising, heat treating the copper conductor and the mica insulation carried thereby in a substantially inert atmosphere for a time of the order of one hour at a temperature of about 400° C. to 450° C. and sufficient to decompose and volatilize a major proportion of the organic binder whereby the surface of the copper conductor is chemically altered and coated with heat decomposed organic binder, impregnating the heat treated conductor and mica insulation with a liquid composition comprising the polymerizable liquid monomeric organic compound having the group $H_2C=C<$ and polymerizing the composition into a resin.

8. In the process of treating a copper conductor carrying mica insulation in which the mica flakes are bonded with an organic binder, with a polymerizable liquid monomeric organic compound having the group $H_2C=C<$, the polymerization being normally inhibited by copper, the steps comprising, heat treating the copper conductor and the mica insulation carried thereby in a substantially inert atmosphere to a temperature and for a time of the order of one hour at 400° C. to 450° C. and sufficient to decompose and volatilize a major proportion of the organic binder whereby the surface of the copper conductor is chemically altered and coated with heat decomposed organic binder, impregnating the heat treated conductor and mica insulation with a composition comprising the polymerizable liquid monomeric organic compound having the group $H_2C=C<$ and the reaction product of an olefinic alpha, beta-dicarboxylic acid and an aliphatic alcohol and polymerizing the composition into a resin.

9. An insulated conductor comprising, in combination, a copper conductor, a tape composed of a sheet fiber backing and mica flakes wrapped about the copper conductor, and inorganic fibrous sheet wrapped over the mica tape, a carbonaceous residue being disposed in the mica and fibrous sheet, the carbonaceous residue derived from an organic binder originally present in the mica tape by heat treatment of the wrapped conductor in a substantially inert atmosphere at a temperature sufficient to decompose and volatilize the major portion of the organic binder, the surface of the copper conductor being chemically altered by the heat treatment and coated with heat decomposed organic binder, and a polymerized resin derived from a completely polymerizable fluid composition applied to the conductor and heat treated wrapping to impregnate the wrappings and to bond the whole into a solid member.

EARL L. SCHULMAN.
JOHN S. JOHNSON.

REFERENCES CITED

The following references are of record in the file of this patent:

UNITED STATES PATENTS

| Number | Name | Date |
|---|---|---|
| 1,118,446 | Roos | Nov. 24, 1914 |
| 1,827,571 | Fiene | Oct. 13, 1931 |
| 1,842,970 | Hovey | Jan. 26, 1932 |
| 2,106,850 | McCulloch | Feb. 1, 1938 |
| 2,225,034 | Connors | Dec. 17, 1940 |
| 2,341,219 | Jones | Feb. 8, 1944 |
| 2,370,046 | Keyes | Feb. 20, 1945 |